US009538147B2

(12) United States Patent
Hanina et al.

(10) Patent No.: US 9,538,147 B2
(45) Date of Patent: *Jan. 3, 2017

(54) METHOD AND SYSTEM FOR DETERMINING PROPER POSITIONING OF AN OBJECT

(71) Applicant: Ai Cure Technologies, Inc., New York, NY (US)

(72) Inventors: Adam Hanina, New York, NY (US); Gordon Kessler, Mt. Kisco, NY (US); Lei Guan, Harrison, NJ (US)

(73) Assignee: AIC Innovations Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,869

(22) Filed: Jul. 15, 2015

(65) Prior Publication Data

US 2015/0326835 A1 Nov. 12, 2015

Related U.S. Application Data

(63) Continuation of application No. 13/036,210, filed on Feb. 28, 2011, now Pat. No. 9,116,553.

(51) Int. Cl.
| | |
|---|---|
| *H04N 7/18* | (2006.01) |
| *G06K 9/00* | (2006.01) |
| *H04N 5/232* | (2006.01) |
| *G06F 3/01* | (2006.01) |
| *G06F 3/03* | (2006.01) |

(52) U.S. Cl.
CPC ............... *H04N 7/183* (2013.01); *G06F 3/011* (2013.01); *G06F 3/017* (2013.01); *G06F 3/0304* (2013.01); *G06K 9/00335* (2013.01); *G06K 9/00355* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 3,814,845 | A | 6/1974 | Hurlbrink et al. |
| 5,065,447 | A | 11/1991 | Barnsley et al. |
| 5,441,047 | A | 8/1995 | David et al. |
| 5,544,649 | A | 8/1996 | David et al. |
| 5,619,991 | A | 4/1997 | Sloane |

(Continued)

OTHER PUBLICATIONS

Ammouri, S.; Biloduau, G. -A, "Face and Hands Detection and Tracking Applied to the Monitoring of Medication Intake," Computer and Robot Vision, 2008. CRV '08. Canadian Conference, 147(154):28-30, May 2008.

(Continued)

*Primary Examiner* — Sath V Perungavoor
*Assistant Examiner* — Dakshesh Parikh
(74) *Attorney, Agent, or Firm* — Fish & Richardson P.C.

(57) ABSTRACT

A method and apparatus for determining an indication of interaction in a direction towards a webcam. The method includes the steps of determining an object in a region of interest, determining a first size of the object in the region of interest and tracking the object in the region of interest. A second size of the object in the region of interest is then determined, and a push interaction is confirmed as having taken place if the ratio of the second size to the first size is greater than a predetermined value.

20 Claims, 5 Drawing Sheets

(56) References Cited

U.S. PATENT DOCUMENTS

| | | |
|---|---|---|
| 5,646,912 A | 7/1997 | Cousin |
| 5,752,621 A | 5/1998 | Passamante |
| 5,764,296 A | 6/1998 | Shin |
| 5,810,747 A | 9/1998 | Brundy et al. |
| 5,911,132 A | 6/1999 | Sloane |
| 5,961,446 A | 10/1999 | Beller et al. |
| 6,151,521 A | 11/2000 | Guo et al. |
| 6,154,558 A * | 11/2000 | Hsieh ............... G06K 9/00335 382/103 |
| 6,233,428 B1 | 5/2001 | Fryer |
| 6,283,761 B1 | 9/2001 | Joao |
| 6,380,858 B1 | 4/2002 | Yarin et al. |
| 6,409,661 B1 | 6/2002 | Murphy |
| 6,421,650 B1 | 7/2002 | Goetz et al. |
| 6,483,993 B1 | 11/2002 | Misumi et al. |
| 6,484,144 B2 | 11/2002 | Martin et al. |
| 6,535,637 B1 | 3/2003 | Wootton et al. |
| 6,611,206 B2 | 8/2003 | Eshelman et al. |
| 6,705,991 B2 | 3/2004 | Bardy |
| 6,879,970 B2 | 4/2005 | Shiffman et al. |
| 6,988,075 B1 | 1/2006 | Hacker |
| 7,184,047 B1 | 2/2007 | Crampton |
| 7,184,075 B2 | 2/2007 | Reiffel |
| 7,256,708 B2 | 8/2007 | Rosenfeld et al. |
| 7,277,752 B2 | 10/2007 | Matos |
| 7,304,228 B2 | 12/2007 | Bryden et al. |
| 7,307,543 B2 | 12/2007 | Rosenfeld et al. |
| 7,317,967 B2 | 1/2008 | DiGianfilippo et al. |
| 7,340,077 B2 | 3/2008 | Gokturk |
| 7,395,214 B2 | 7/2008 | Shillingburg |
| 7,415,447 B2 | 8/2008 | Shiffman et al. |
| 7,448,544 B1 | 11/2008 | Louie et al. |
| 7,562,121 B2 | 7/2009 | Berisford et al. |
| 7,627,142 B2 | 12/2009 | Kurzweil et al. |
| 7,657,443 B2 | 2/2010 | Crass et al. |
| 7,692,625 B2 | 4/2010 | Morrison et al. |
| 7,747,454 B2 | 6/2010 | Bartfeld et al. |
| 7,761,311 B2 | 7/2010 | Clements et al. |
| 7,769,465 B2 | 8/2010 | Matos |
| 7,774,075 B2 | 8/2010 | Lin et al. |
| 7,874,984 B2 | 1/2011 | Elsayed et al. |
| 7,881,537 B2 | 2/2011 | Ma et al. |
| 7,908,155 B2 | 3/2011 | Fuerst et al. |
| 7,912,733 B2 | 3/2011 | Clements et al. |
| 7,956,727 B2 | 6/2011 | Loncar |
| 7,983,933 B2 | 7/2011 | Karkanias et al. |
| 8,321,284 B2 | 11/2012 | Clements et al. |
| 2001/0049673 A1 | 12/2001 | Dulong et al. |
| 2001/0056358 A1 | 12/2001 | Dulong et al. |
| 2002/0026330 A1 | 2/2002 | Klein |
| 2002/0093429 A1 | 7/2002 | Matsushita et al. |
| 2002/0143563 A1 | 10/2002 | Hufford et al. |
| 2003/0164172 A1 | 9/2003 | Chumas et al. |
| 2003/0190076 A1 | 10/2003 | Delean |
| 2003/0225325 A1 | 12/2003 | Kagermeier et al. |
| 2004/0100572 A1 | 5/2004 | Kim |
| 2004/0107116 A1 | 6/2004 | Brown |
| 2004/0155780 A1 | 8/2004 | Rapchak |
| 2005/0144150 A1 | 6/2005 | Ramamurthy et al. |
| 2005/0149361 A1 | 7/2005 | Saus et al. |
| 2005/0180610 A1 | 8/2005 | Kato et al. |
| 2005/0182664 A1 | 8/2005 | Abraham-Fuchs et al. |
| 2005/0234381 A1 | 10/2005 | Niemetz et al. |
| 2005/0267356 A1 | 12/2005 | Ramasubramanian et al. |
| 2006/0066584 A1 | 3/2006 | Barkan |
| 2006/0218011 A1 | 9/2006 | Walker et al. |
| 2006/0238549 A1 | 10/2006 | Marks |
| 2007/0008112 A1 | 1/2007 | Covannon et al. |
| 2007/0008113 A1 | 1/2007 | Spoonhower et al. |
| 2007/0030363 A1 | 2/2007 | Cheatle et al. |
| 2007/0118389 A1 | 5/2007 | Shipon |
| 2007/0194034 A1 | 8/2007 | Vasiadis |
| 2007/0233035 A1 | 10/2007 | Wehba et al. |
| 2007/0233049 A1 | 10/2007 | Wehba et al. |
| 2007/0233050 A1 | 10/2007 | Wehba et al. |
| 2007/0233281 A1 | 10/2007 | Wehba et al. |
| 2007/0233520 A1 | 10/2007 | Wehba et al. |
| 2007/0233521 A1 | 10/2007 | Wehba et al. |
| 2007/0265880 A1 * | 11/2007 | Bartfeld ............ G06F 19/3462 705/2 |
| 2007/0273504 A1 | 11/2007 | Tran |
| 2008/0000979 A1 | 1/2008 | Poisner |
| 2008/0093447 A1 | 4/2008 | Johnson et al. |
| 2008/0114226 A1 | 5/2008 | Music et al. |
| 2008/0114490 A1 | 5/2008 | Jean-Pierre |
| 2008/0138604 A1 | 6/2008 | Kenney et al. |
| 2008/0140444 A1 | 6/2008 | Karkanias et al. |
| 2008/0162192 A1 | 7/2008 | Vonk et al. |
| 2008/0178126 A1 | 7/2008 | Beeck et al. |
| 2008/0201174 A1 | 8/2008 | Ramasubramanian et al. |
| 2008/0219493 A1 | 9/2008 | Tadmor |
| 2008/0275738 A1 | 11/2008 | Shillingburg |
| 2008/0290168 A1 | 11/2008 | Sullivan et al. |
| 2008/0297589 A1 | 12/2008 | Kurtz et al. |
| 2008/0303638 A1 | 12/2008 | Nguyen et al. |
| 2009/0012818 A1 | 1/2009 | Rodgers |
| 2009/0018867 A1 | 1/2009 | Reiner |
| 2009/0043610 A1 | 2/2009 | Nadas et al. |
| 2009/0048871 A1 | 2/2009 | Skomra |
| 2009/0095837 A1 | 4/2009 | Lindgren |
| 2009/0127339 A1 * | 5/2009 | Needham ............ G06F 19/3456 235/454 |
| 2009/0128330 A1 | 5/2009 | Monroe |
| 2009/0159714 A1 | 6/2009 | Coyne, III et al. |
| 2009/0217194 A1 | 8/2009 | Martin et al. |
| 2009/0245655 A1 | 10/2009 | Matsuzaka |
| 2010/0042430 A1 | 2/2010 | Bartfield |
| 2010/0050134 A1 | 2/2010 | Clarkson |
| 2010/0057646 A1 | 3/2010 | Martin et al. |
| 2010/0092093 A1 | 4/2010 | Akatsuka et al. |
| 2010/0136509 A1 | 6/2010 | Mejer et al. |
| 2010/0138154 A1 | 6/2010 | Kon |
| 2010/0255598 A1 | 10/2010 | Melker |
| 2010/0262436 A1 | 10/2010 | Chen et al. |
| 2010/0316979 A1 | 12/2010 | Von Bismarck |
| 2011/0021952 A1 | 1/2011 | Vallone |
| 2011/0119073 A1 | 5/2011 | Hanina et al. |
| 2011/0141009 A1 * | 6/2011 | Izumi .................... A63F 13/04 345/156 |
| 2011/0153360 A1 | 6/2011 | Haninia et al. |
| 2011/0161109 A1 | 6/2011 | Pinsonneault et al. |
| 2011/0195520 A1 | 8/2011 | Leider et al. |
| 2011/0275051 A1 | 11/2011 | Hanina et al. |
| 2012/0075464 A1 | 3/2012 | Derenne et al. |

OTHER PUBLICATIONS

Batz, et al. "A computer Vision System for Monitoring Medication Intake," in Proc. IEEE 2nd Canadian Conf. on Computer and Robot Vision, Victoria, BC, Canada, 2005, pp. 362-369.

Bilodeau et al. Monitoring of Medication Intake Using a Camera System. Journal of Medical Systems 2011. [retrieved on Feb. 18, 2013] Retrieved from ProQuest Technology Collection.

Chen, Pauline W., "Texting as a Health Tool for Teenagers", The New York Times, Nov. 5, 2009, http://www.nytimes.com/2009/11/05/health/0512/899,510.

Danya International, Inc., "Pilot Study Using Cell Phones for Mobile Direct Observation Treatment to Monitor Medication Compliance of TB Patients", Mar. 20, 2009, www.danya.com/MDOT.asp.

Global Tuberculosis Control: A short update to the 2009 report, World Health Organization, (2009).

Huynh et al., "Real time detection, tracking and recognition of medication intake." World Academy of Science, Engineering and Technology 60 (2009), 280-287.

Mintchell, "Exploring the Limits of Machine Vision", Automating World, Oct. 1, 2011.

Osterberg, Lars and Blaschke, Terrence, "Adherence to Medication", New England Journal of Medicine 2005; 353:487-97, Aug. 4, 2005.

Super-Resolution, Wikipedia, (Oct. 5, 2010).

(56) References Cited

OTHER PUBLICATIONS

University of Texas, GuideView, Mar. 15, 2007, http://www.sahs.uth.tmc.edu/MSriram/GuideView.
Valin, et al. "Video Surveillance of Medication intake", Int. Conf. of the IEEE Engineering in Medicine and Biology Society, New York City, USA, Aug. 2006.
Wang et al. "Recent Developments in human motion analysis." Pattern Recognition 36 (220) 585-601 (Nov. 2001).
Whitecup, Morris S., "2008 Patient Adherence Update: New Approaches for Success", www.guideline.com , The Trend Report Series, (Oct. 1, 2008).
Final Office Action from PTO, (U.S. Appl. No. 12/620,686), (May 8, 2012), 1-24.
Final Office Action from PTO, (U.S. Appl. No. 13/558,377), May 7, 2013, 1-29.
Final Office Action from PTO, (U.S. Appl. No. 12/646,383), (May 8, 2012), 1-31.
Final Office Action from PTO, (U.S. Appl. No. 13/588,380), (Mar. 1, 2013), 1-27.
Final Office Action from PTO, (U.S. Appl. No. 12/646,603), (Feb. 1, 2012), 1-17.
Final Office Action from PTO, (U.S. Appl. No. 12/728,721), (Apr. 12, 2012), 1-31.
Final Office Action from PTO, (U.S. Appl. No. 12/815,037), (Sep. 13, 2012), 1-15.
Final Office Action from PTO, (U.S. Appl. No. 12/899,510), (Aug. 20, 2013).
Final Office Action from PTO, (U.S. Appl. No. 12/898,338), Nov. 9, 2012), 1-12.
Final Office Action from PTO, (U.S. Appl. No. 13/189,518), (Jul. 23, 2013), 1-16.
International Preliminary Report on Patentability, (PCT/US2010/056935) (May 31, 2012), 1-8.
Non-Final Office Action from PTO, (U.S. Appl. No. 12/620,686), (Dec. 21, 2011),1-78.
Non-Final Office Action from PTO, (U.S. Appl. No. 13/558,377), (Oct. 22, 2012), 1-21.
Non-Final Office Action from PTO, (U.S. Appl. No. 12/646,383), (Dec. 22, 2011),1-78.
Non-Final Office Action from PTO, (U.S. Appl. No. 13/558,380), (Oct. 4, 2012), 1-20.
Non-Final Office Action from PTO, (U.S. Appl. No. 12/646,603), (Oct. 13, 2011),1-74.
Non-Final Office Action from PTO, (U.S. Appl. No. 12/646,603), (Jun. 13, 2013), 1-16.
Non-Final Office Action from PTO, (U.S. Appl. No. 12/728,721), (Jan. 6, 2012), 1-31.
Non-Final Office Action from PTO, (U.S. Appl. No. 12/728,721), (May 9, 2013), 1-25.
Non-Final Office Action from PTO, (U.S. Appl. No. 12/815,037), (Mar. 28, 2012),1-17.
Non-Final Office Action from PTO, (U.S. Appl. No. 12/815,037), (Jul. 18, 2013), 1-19.
Non-Final Office Action from PTO, (U.S. Appl. No. 12/899,510), (Jan. 23, 2013), 1-20.
Non-Final Office Action from PTO, (U.S. Appl. No. 12/898,338), (Jun. 19, 2012), 1-16.
Non-Final Office Action from PTO, (U.S. Appl. No. 13/189,518), (Dec. 21, 2012), 1-10.
Non-Final Office Action from PTO, (U.S. Appl. No. 13/235,387), Sep. 12, 2013), 1-16.
PCT Search report and written opinion, (PCT/US2010/56935, (Jan. 12, 2011),1-9.
PCT Search report and written opinion, (PCT/US2011/35093, (Sep. 12, 2011),1-8.
PCT Search report and written opinion, (PCT/US11/54666), (Feb. 28, 2012), 1-13.
PCT Search report and written opinion, (PCT/US11/54668), Feb. 28, 2012, 1-12.
PCT Search report and written opinion, (PCT/US12/41785), (Aug. 17, 2012),1-10.
PCT Search report and written opinion, (PCT/US12/42843), (Aug. 31, 2012), 1-8.
PCT Search report and written opinion, (PCT/US2012/051554), (Oct. 19, 2012), 1-12.
PCT Search report and written opinion, (PCT/US12/59139), (Dec. 18, 2012), 1-15.
PCT Search report and written Opinion, (PCT/US13/20026), (Aug. 5, 2013), 1-14.

\* cited by examiner

METHOD AND SYSTEM FOR DETERMINING PROPER POSITIONING OF AN OBJECT

FIELD OF THE INVENTION

This invention relates generally to a method and apparatus for determining push interaction, and more particularly to an apparatus and method for determining a user intended push interaction employing only a standard webcam.

BACKGROUND OF THE INVENTION

Many gesture recognition systems typically employ complex and complicated time of flight cameras, stereo cameras, or other such sophisticated systems. In order to determine action in a z-axis direction relative to a camera, time of flight cameras are equipped with a system for determining a distance from the camera at any time. Similarly, a stereo camera system is able to employ a triangulation or other stereo distance determination. Each of these systems is a complex system not typically employed in a standard computer laptop or other mobile device. Therefore, these systems are not available for use in a more typical computer or mobile device environment.

In order to overcome these drawbacks, various systems employ complex hybrid systems to overcome the z-axis. For example, U.S. Pat. No. 7,774,075 presents a method and apparatus for determining an object's three-dimensional location (i.e. real world coordinates) using the audio-video infrastructure of a 3G cellular phone or a 3C (Computer, Communications, Consumer) electronic device. A first detection device (e.g. a camera) is used to capture images of the objects. The captured image data is used to compute location data of the object in a first two-dimensional plane. A second detection device (e.g. microphone or infrared detector) may be used to collect additional location data in a second plane, which when combined with image data from the captured images allows the determination of the real world coordinates (x, y, z) of the object. The real-world coordinate data may be used in various applications.

In an alternative embodiment of this '075 patent, if the size of an object of interest is known or can be calculated, and the size of the projected image does not vary due to rotation of the object, a single camera (e.g. the camera in a 3G or 3C mobile device) may be used to obtain three-dimensional coordinate data for the applications.

For use in mobile or other unstable environments, however, calculation of a precise 3D coordinate may be difficult because of various factors. Furthermore, there is no way to guarantee that the object will not rotate. Furthermore, a mobile or other portable platform may result in a webcam that is likely to be moved about quite a bit, thus potentially requiring frequent recalibration of the system. Furthermore, movement may be improperly interpreted as deliberate action, thus resulting in false actions being taken by the system. Therefore, it would be beneficial to provide a method and apparatus that overcome the drawbacks of the prior art.

SUMMARY OF THE INVENTION

In accordance with various embodiments of the present invention, a push interaction useful for determining movement in a z-axis direction relative to a webcam is provided. Rather than relying upon complex systems for making such a determination, a simple system for determining an initial size of an object, and then later comparing a size of an object to that initial size to determine intentional motion in the z-axis direction relative to the camera is provided. Further object tracking in the x and y axis directions places the object at a particular location in a field of view, allowing for selection between one or more objects included in that field of view.

Depth or proximity indications may be provided as feedback to a user of the system. Such indications may be provided in a visual, audible, or other appropriate fashion, allowing the user to determine when a particular selection or other indication has been made, and aiding the user in properly positioning an object. Through the use of such selection mechanism, a user may simulate the selection mechanism employed with a touch screen or conventional keyboard without making contact with any particular surface. Such application may be desirable when considering publically available keypads or other input devices to avoid germs or the like. Furthermore, by receiving such a selection indicators, a user may be encouraged or enabled to change their selection before such selection is confirmed.

While the invention is generally described as applicable to a simple webcam provided in a computer, mobile device or other computing apparatus, the invention may also be applied to any single camera that does not otherwise have the ability to independently determine distance, such as with a single infrared or other camera.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
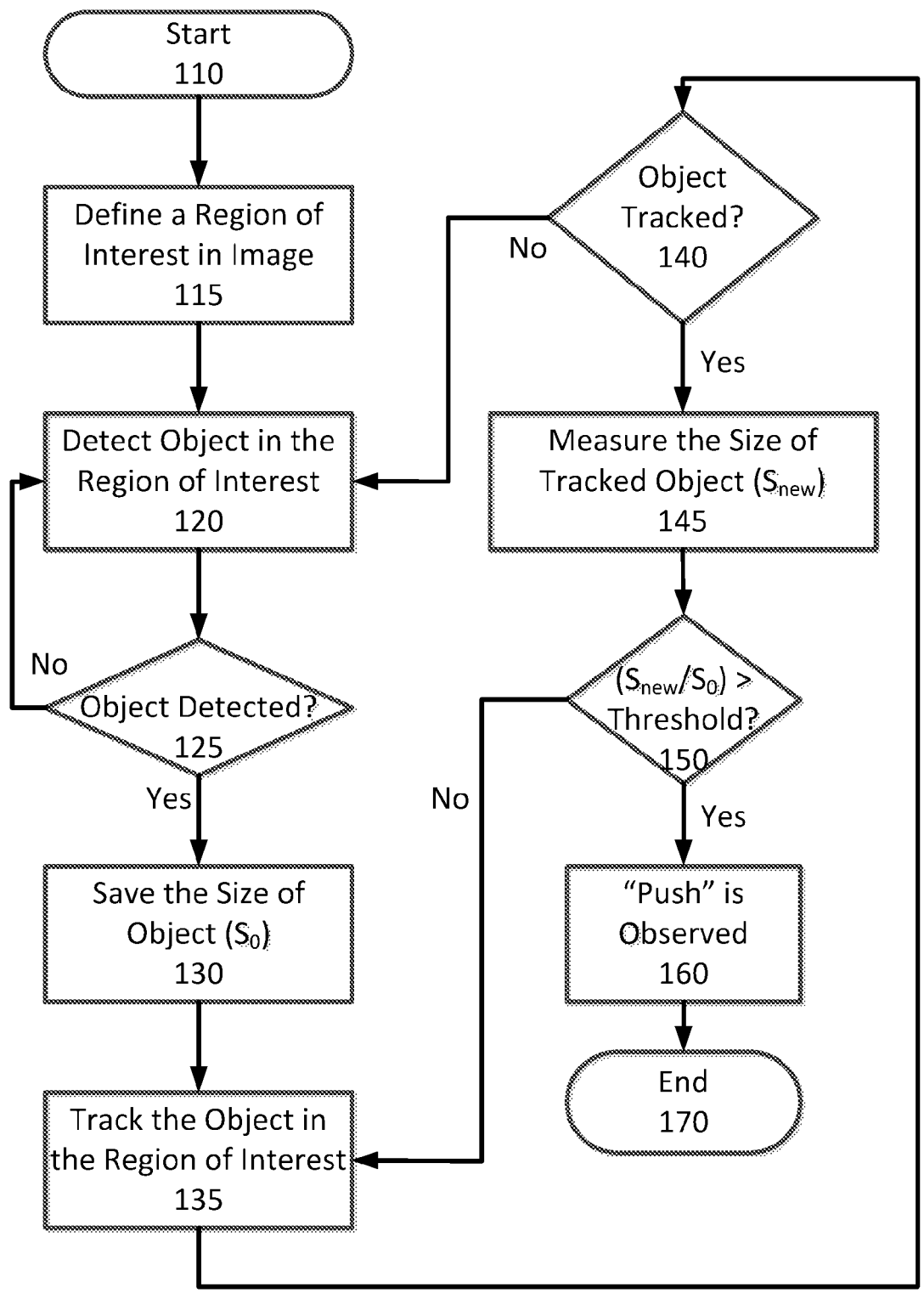
FIG. 1 is a flowchart diagram depicting a method for determining a push interaction in accordance with an embodiment of the present invention.

Detailed embodiments of the present invention will now be described, making reference to the following figures in which like reference number denote like structure or steps. Referring first to FIG. 1, processing begins at step 110, and at step 115 a region of interest is defined. This region of interest may be defined as a predetermined portion of a display or field of view of a camera. In a preferred embodiment of the invention, this region of interest may be designated by an indicator on the screen in which a user is desired to place the object. Once this region of interest is defined, processing passes to step 120 where a sequence for determining whether an object of interest is present in the defined region. In accordance with this sequence, at step 120 various parameters and images are sampled, and at step 125 a determination is made as to whether an object is detected within the region of interest. If this inquiry is answered in the negative, processing returns to step 120 and the object detection sequence continues.

If the inquiry at step 125 is answered in the affirmative, and it is therefore determined that an object has been detected in the region of interest, processing continues at step 130 where an initial size of the object ($S_O$) is determined. This initial size is one that is not necessarily related to the absolute size of the object, but is rather related to the perceived size of the object when placed within the region of interest. Thus, when shown to a webcam, the perceived size is determined, which will be based upon the actual size of the object, as well as distance from the webcam.

Once the initial size of the object has been determined, the object is tracked within the region of interest at step 135, and at step 140, it is confirmed that the object is able to be tracked. If at step 140 it is determined that the object cannot be tracked, processing once again returns to step 120, and the object is detected anew. If on the other hand, it is determined at step 140 that the object is being properly tracked, processing passes to step 145 where a current size of the object ($S_{new}$) is measured.

After such a measurement, at step 150 it is determined whether a ratio of the new size to the old size ($S_{new}/S_O$) is greater than a predetermined threshold. If the inquiry at step 150 is answered in the negative, and therefore the ratio is not greater than the predetermined threshold, processing returns to step 135, and tracking of the object within the region of interest continues. If on the other hand, if the inquiry at step 150 is answered in the affirmative, and it is therefore determined that the ratio is greater than a predetermined threshold, processing continues at step 160 where it is confirmed that a push has been observed. Processing then ends at step 170.

Figure 2:
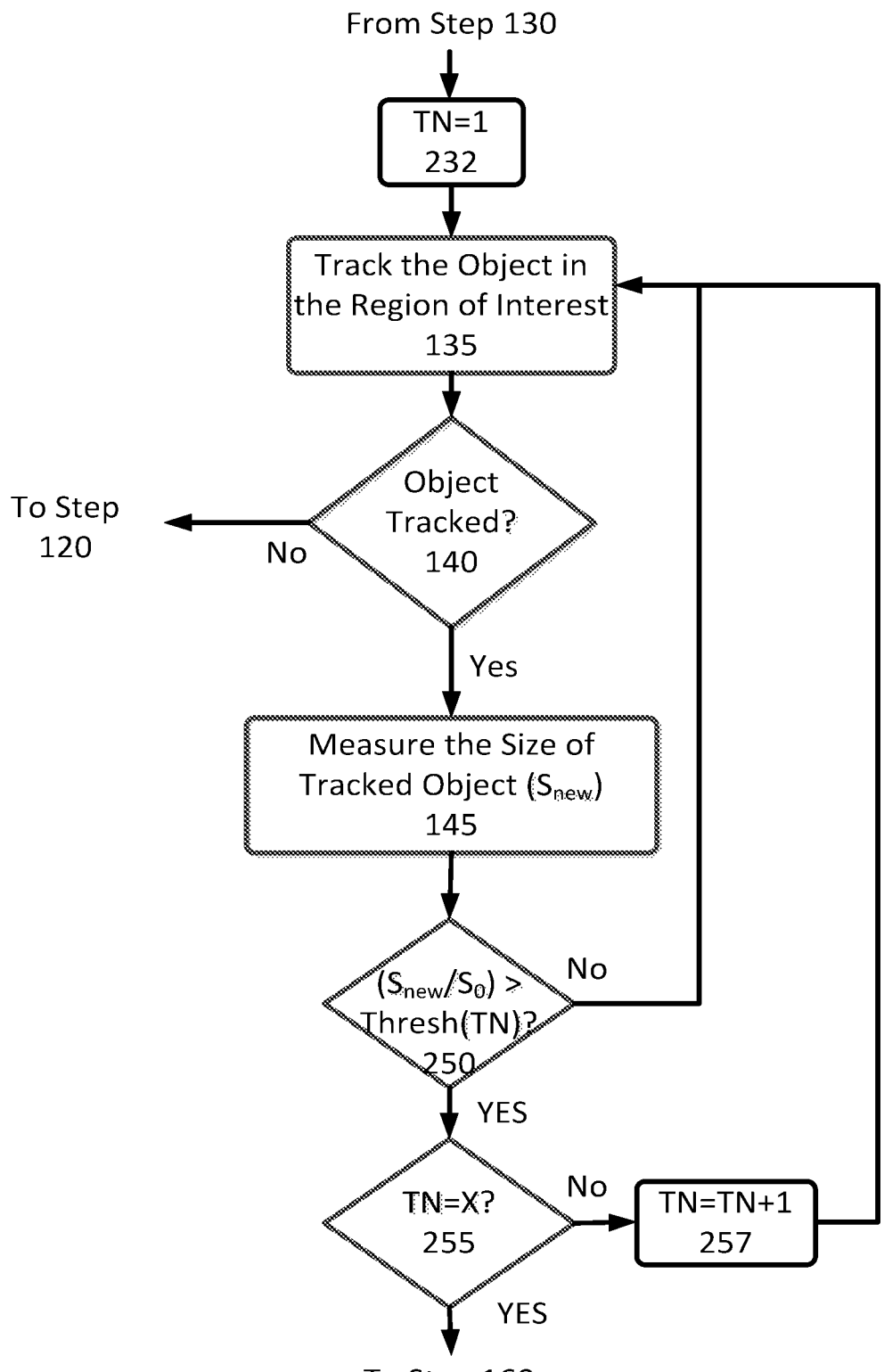
FIG. 2 is a flowchart diagram depicting a method for determining a push interaction in accordance with an additional embodiment of the present invention.

In an alternative embodiment of the invention, in order to improve the accuracy of determining whether a push has been observed, a multi-level threshold scheme may be employed. Thus, as is shown in FIG. 2, after step 130 (FIG. 1) processing passes to step 232, where a threshold number (TN) is set to one, indicating that a first threshold ratio should be employed. Thereafter, processing continues through steps 135, 140 and 145 as described above with respect to FIG. 1. After the size measurement at step 145, processing in FIG. 2 then passes to step 250 where it is determined whether the size ratio ($S_{new}/S_O$) is greater than a threshold value associated with the first threshold number (TN=1). If this inquiry is answered in the negative, and it is therefore determined at step 250 that the ratio is not greater than the threshold value associated with the first threshold number, processing returns back to step 135.

If the inquiry at step 250 is answered in the affirmative, and it is therefore determined that the size ratio ($S_{new}/S_O$) is greater than the threshold value associated with the first threshold number (TN=1), processing continues with step 255 where it is inquired as to whether the threshold number is equal to a predetermined number, indicative of the number of threshold tests are to be performed. If this inquiry at step 255 is answered in the negative, and it is therefore determined that the current threshold number is not equal to the desired threshold number, then processing passes to step 257 where the threshold number is incremented by one (in this case to two), and processing returns to step 135.

This processing continues for the predetermined number of threshold tests desired, each sequence using a threshold associated with the then-current threshold number. It is anticipated that each such threshold is larger than the prior threshold, thus allowing for a determination of continued motion forward towards the webcam, but of course any such threshold sequence may be employed to test for any simple or complex desired motion. Once the threshold has been met for the desired number of thresholds, the inquiry at step 255 will be answered in the affirmative, and processing will continue at step 160 of FIG. 1.

In accordance with various embodiments of the present invention, the above described push interaction may act as a replacement to touchscreen technology where users are otherwise unwilling to make physical contact with a screen (which can be dirty or otherwise inconvenient) and where the screens and selection choices are preferably limited. Embodiments of the present invention may have numerous applications in conjunction with mobile and other devices including small screens since the object, which may comprise the finger of a user, may be much closer to the camera and hence, determining size changes and tracking the object may be enhanced. Applications may include gaming and other interactive programming. Such a push interaction system as set forth in accordance with embodiments of the present invention allows a webcam system to recognize if an action is deliberate—thus avoiding indicating a selection based upon accidental motion of erroneous object tracking. Similarly, the user may not be required to hold their hand or finger (object) still in space for a relatively long period of time.

Figure 3:
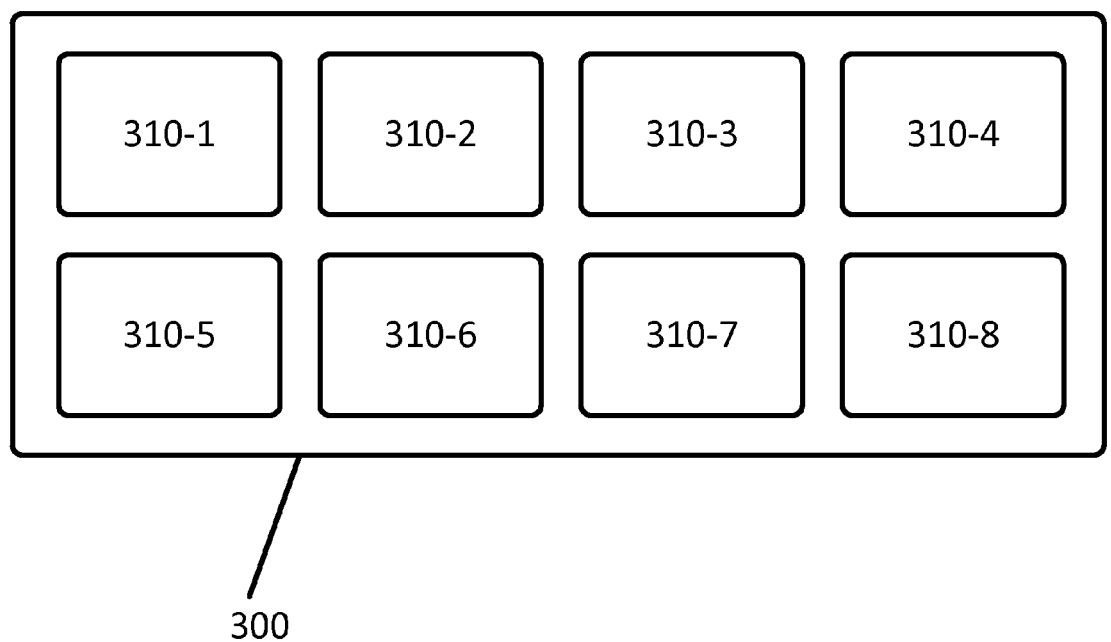
FIG. 3 is a block diagram depicting a selection sequence, including feedback provided to a user, in accordance with an embodiment of the invention.

In a preferred embodiment of the invention, the object described above may comprise the finger of a user. The system may therefore involve tracking the finger and recognizing if the finger moves closer towards a camera or not. Furthermore, a plurality of regions of interest may be provided, thus allowing for the determination of selection of one choice from among many. Therefore, as is shown in FIG. 3, a plurality of displayed regions of interest 310- to 310-8 may be provided on a display 300. Of course, any desired number of regions of interest may be provided. In a preferred embodiment of the invention, each region of interest may comprise a button to be selected, a key on a keypad, or any other selectable item.

Implementing the flowchart diagram as set forth in FIGS. 1 and 2, a user's finger or the like may be determined to be within a particular region of interest (310-1 to 310-8) on an x,y basis by positioning the finger by the webcam. In a preferred embodiment, when it is determined that the finger is within one of such regions, and indication on the display is provided, such as a shading of that particular region of interest, or other visual or other indicator that may be understood by the user. If the user moves their finger in the x or y axis direction, when they move from one region to another, the indicator follows along. In accordance with an additional embodiment of the invention, there will be some allowance for movement by the finger (or shake) that is not intended to comprise a movement from one region of interest to another, since buttons or regions of interest are preferably selected based on an approximate position of the finger. Thus, a determination of deliberate desire to move from one region of interest to another will be required before the system indicates such movement. The system may, therefore, allow for some latitude of motion (perhaps accounting for shake of the user's finger, or shake of the imaging apparatus in the x,y direction in addition to the z direction), but beyond a certain range of motion by the user's finger, the system will determine that the next region of interest or button is to be selected. Application of such technology may be in one or more hospital, doctor or other healthcare environment, ATMs, taxi cabs, elevators, interactive billboards, gaming applications, or other situation where contact with a button or the like is preferably avoided.

Thereafter, as is set forth in FIGS. 1 and 2, a deliberate indication of motion towards the camera by the user will provide a selection of the item associated with the currently indicated region of interest. In the case of the multi-threshold determination as set forth in FIG. 2, as the user moves their finger closer to the camera, an indication at the region of interest, such as by sequentially darkening the color each time a threshold is passed, or other visual or audio indications, may be provided to the user. Thus, the user is preferably provided with positive feedback indicating selection. The user may also be made aware of an erroneous selection, and may therefore withdraw their finger in such a case, indicated a correct region of interest in the manner noted above, and then make a selection.

Thus, in order to offer a deliberate method to select an onscreen button or other selection, the user will be able to push through space and see a confirmatory change in color of the selection, or other appropriate indicator. Completion of the push may be highlighted by a final color change or other indicator. If the user changes their mind mid-way, the user may reset and stop the motion before the final indicator has been displayed or otherwise invoked. In an alternative embodiment of the invention, the user may be allowed to swipe their hand across the screen to reset. Thus, the system is adapted to link a visual size scale to finger proximity thereby providing feedback to the user that their action/selection is deliberate and registered with the system.

Figure 4:
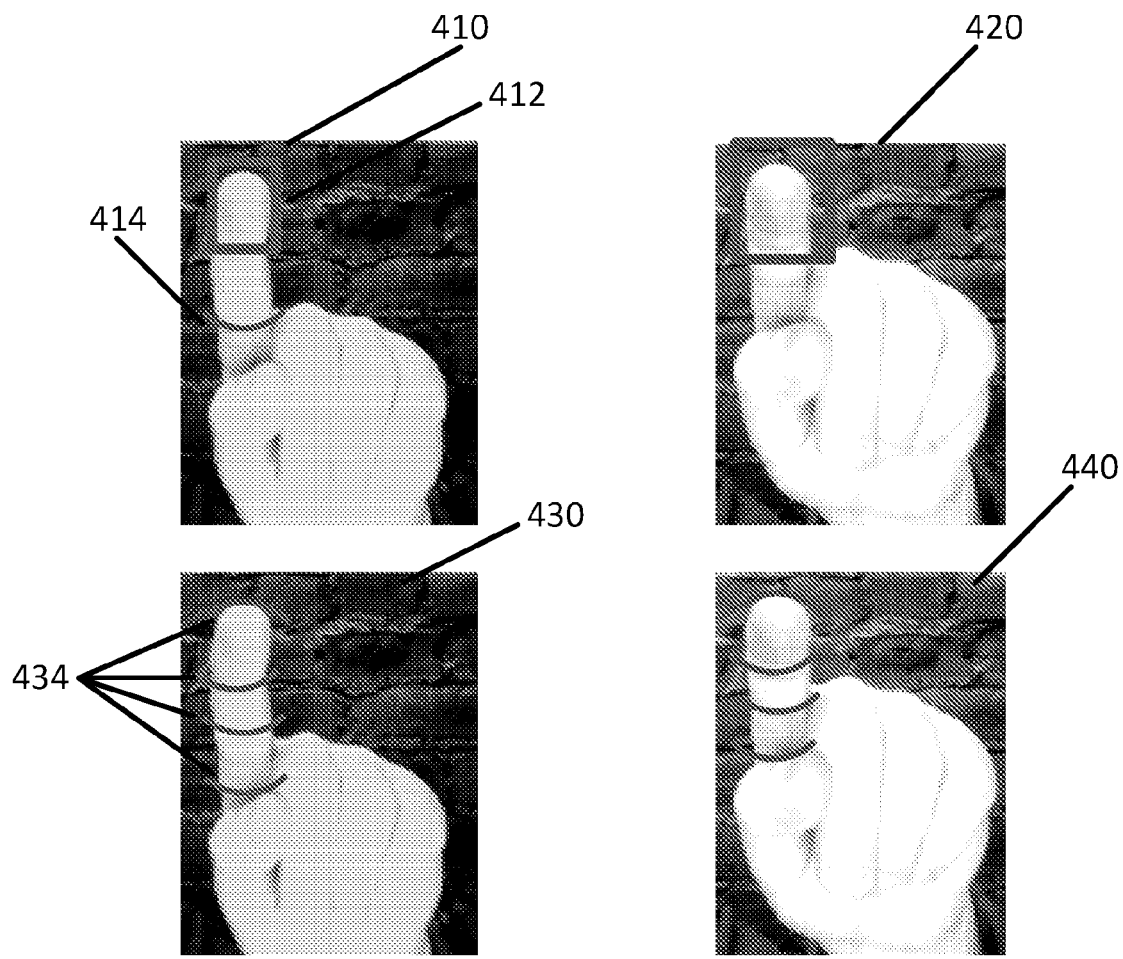
FIG. 4 is a sequence of images depicting additional feedback to a user in accordance with an embodiment of the invention.

In an alternative embodiment, rather than simply tracking a particular object, such as a user's finger, it may be desirable to track various portions of such an object, thus determining relative movement between these various elements. As is shown in FIG. 4, in image 410 an indicator of the tip of a user's finger is shown at 412. Further shown is a second finger reference point 414 indicating another reference point on the finger to possibly be used in determining the location and push interaction. Thus, as is shown in image 420, indicator 412 has increased in size while finger reference point 414 has disappeared, indicating that the reference point is no longer distinguishable in the image. Together, these two movements may provide an indication of movement of the finger from an upright position, to a more pointing position, relative to the webcam. Similarly, in image 430, reference points 434 indicate a tip and other features, such as skin folding by the joints. Then, as shown in image 440, a change in the relative positioning may be interpreted as a change in hand or finger position, thus aiding in an indication of push or other selection. This embodiment of the invention may be desirable when a user may move a portion of their hand out of field of view of the camera. Thus, as long as one or more of the reference points are visible, a determination of object motion may still be made.

It has further been determined by the inventors of the present invention that users whose finger or the like is in close proximity to a webcam interacting in a push situation may encounter a parallax problem in that as they move their finger closer to the webcam, in a straight line to the display, if they are not pointing directly at the camera, their finger will appear to be moving off in a direction away from the webcam. This "x,y creep" may be compensated for, and may be considered another method for determining whether a push interaction has been encountered. Thus, if the size of an object, such as the user's finger, remains a constant size, but appears to be moving away from the display, a push interaction may be determined. Such motion will not be confused with motion in the x.y direction, as any such movement will result in a reduction of the size of the object, due to the same parallax issues. Preferably, a combination of such parallax and change in size considerations allow for an intelligent determination of user intent and desired interaction.

In an additional embodiment of the invention, it may be desirable to display a visual image captured by the webcam. When doing so, in accordance with an alternative embodiment of the invention, it may be desirable to provide a depth or proximity indicator to provide real-time feedback to the user regarding the positioning of an object by the user. The system may be adapted to track and display one or more dynamic reference points to provide adequate feedback to the user. Thus, upon positioning an object within a field of view by a user, an indication may be displayed along with the display of the webcam captured image view providing an indication of a target location for the object, or an indication of requested direction of movement, in either the x, y or z axis direction. Such indicator in the x and y axis directions may comprise simple arrows, while movement in the z-axis direction may be indicated by an arrow, an indicator employing sequential different size boxes, circles or the like, these indicators changing appearance as the user approaches the desired z-axis location. Additional audible or other indications may be provided to indicate to the user when movement in the correct direction is made, while ultimately a final indication may be provided when the user has reached the desired location.

Figure 5:
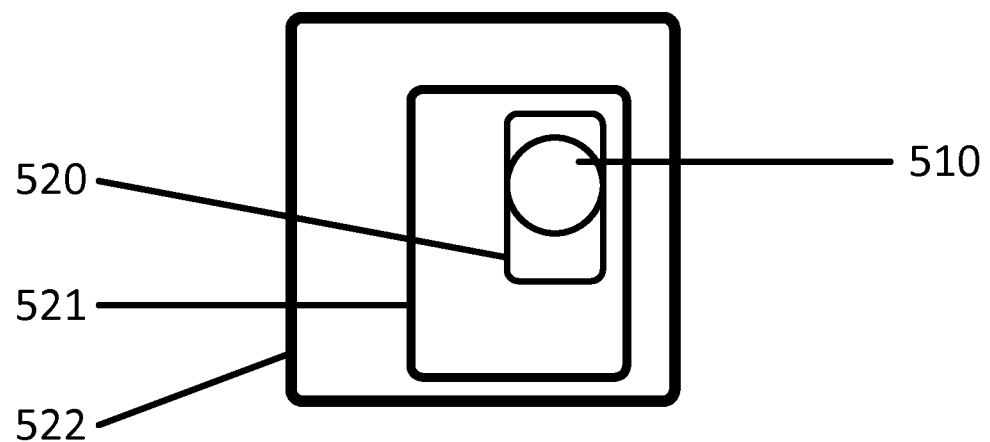
FIG. 5 is a block diagram depicting a positioning aid constructed in accordance with an embodiment of the invention.

Therefore, as is shown by way of example in FIG. 5, an object 510 is recognized and placed within a field of view of a web camera. Preferably, an indicator 522 comprises a desired position and size of object 510. As object 510 is smaller than indicator 522, the user is encouraged to move object 510 closer to the webcam, thus increasing its relative size. In order to further aid in guiding the user, interim indicators 520 and 521 may be shown, further indicating to the user movement forward. Additionally, as the user moves object 510 closer to indicator 522, as each interim indicator 520, 521 is reached an audible, visual or other indication of achievement may be employed. While two such interim indicators are employed, any number may be used. Further, such a system similarly may be employed when object 510 is placed too close to the webcam, and thus object 510 appears larger than indicator 522, the interim indicators being smaller than the object, but larger than indicator 522, and thus indicating movement away from the webcam. These indicators therefore comprise a depth or proximity indicator, and indeed any other embodiment of such an indicator may be employed. Additional embodiments may employ a thermometer or scale type indication, a color based indication, an arrow based indication or the like.

Various embodiments in accordance with the method and apparatus of the present invention may be desirable in unstable environments, such as the use of a mobile device, laptop, or other non-fixed computing apparatus or webcam. Thus, while the user is able to select between one or more objects on a display without contact thereof employing only a single webcam, the user may also be guided to placement of a particular object in a particular location, including a desired distance from a webcam. Furthermore, relative motion of that object in the z-axis direction towards and away from the webcam may be determined with this simple hardware setup. Furthermore, as the system may employ various object markers, it is possible to account for rotation of the object, thus determining whether a size change is based upon absolute motion, or if the view of the object has changed, thus potentially causing a perceived change in size of the object.

Various embodiments of the present invention may be employed in a number of areas, including as a replacement to touchscreens, such as at an ATM, in a taxi, gaming, interactive billboards, or in other public kiosk locations. Embodiments of the invention may be employed to track a medication to determine whether a user has placed a pill or other medication in their mouth or the like. The system may first position the pill to determine the identity thereof, track the pill to the mouth of a user, and then determine that the pill has been placed therein. For one or more sales promotions, a user may Interactive Billboards (push interaction, probe requested to hold an object up to a simple webcam, and be guided in it positioning so that information may be obtained from the object, thus allowing for advertising, coupons, or other messaging to be provided to the user.

Additionally, a game may be provided where a user is requested to differentiate between a number of objects, locate these objects in the x, y plane in the field of view of a webcam, and then move the object in a z-axis direction towards or away from the webcam to indicate selection, or other interaction between the object and an on-screen indicator. The various embodiments described above relating to proximity detection and indication may also be employed. Such an object may include a user's finger or other desirable free-standing object or the like.

Other potential embodiments or uses of the embodiments of the invention include:
  Dancing Games—User may be encouraged to move forward and backwards and to lift up left or right hand/arm based on proximity. Gains points for complying.
  Fighting games—Important to understand position and proximity of the user.
  Pingpong games fingerpong—move finger forward to use the paddle or hit the pingpong with your finger.
  Drumming games—tap the air, to create a beat in sync with the music.
  Air Guitar—recognizes you strumming an air guitar. Strum to the beat to win more points.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for determining proper positioning of an object held in a hand by a user relative to a camera, comprising:
  presenting on a display of a device an indication of a desired location for placement of the object held in the hand of the user relative to a field of view of the camera;
  displaying an indicator on the display of the device for guiding placement of the object held in the hand of the user within the field of view of the camera relative to the indication of desired location for placement of the object;
  determining a position of the object in the hand of the user within the field of view of the camera relative to the desired location for placement of the object;
  adjusting the indicator on the display in response to the determination of the position of the object to the desired location to aid in guiding the user to move the object within the field of view of the camera towards the desired location;
  after adjusting the indicator on the display in response to the determination of the position of the object to the desired location, determining a position of the object in the hand of the user within the field of view of the camera relative to the desired location for placement of the object; and
  presenting on the display an indication of proper positioning of the object in the hand of the user within the field of view of the camera relative to the desired position of the location for placement of the object.

2. The method of claim 1, wherein guiding placement of the object held in the hand of the user relative to the indication of desired location for placement of the object is repeated until it is confirmed that the object is properly placed.

3. The method of claim 1, further comprising determining a parallax angle of movement of the object.

4. The method of claim 3, further comprising employing the determined parallax angle to aid in determining positioning of the object in the hand of the user relative to the desired location for placement of the object.

5. The method of claim 1, further comprising displaying an image of the desired location for the placement of the object.

6. The method of claim 5, wherein the desired location for the placement of the object is displayed to a user to aid in properly placing the object held in the hand of the user.

7. The method of claim 1, wherein if the object held in the hand of the user is removed from a field of view of the camera and then repositioned within the field of view of the camera, determining a position of the object is performed again.

8. The method of claim 1, wherein the object is a medication pill.

9. The method of claim 1, wherein the object is a free standing object held in the hand of the user.

10. A system for determining proper positioning of an object held in the hand of the user relative to a camera, comprising:
  a webcam for capturing one or more images;
  a display arranged to present an indication of a desired location for placement of the object in the hand of the user relative to a field of view of the camera, and to display an indicator for guiding placement of the object held in the hand of the user relative to the field of view of the camera so that the display of the object is guided towards the indication of the desired location; and
  a processor arranged to process the one or more captured images, the processor operable to present on the display an indication of a desired location for placement of the object held in the hand of the user relative to the field of view of the camera, display an indicator on the display guiding in the field of view of the camera placement of the object held in the hand of the user relative to the indication of desired location for placement of the object, determine a position of the object in the hand of the user in the field of view of the camera relative to the desired location for placement of the object, adjust the indicator on the display in response to the determination of the position of the object to the desired location to aid in guiding the user to move the object towards the desired location, determine a position of the object in the hand of the user in the field of view of the camera relative to the desired location for placement of the object, and present on the display an indication of proper positioning of the object in the hand of the user in the field of view of the camera relative to the desired position for placement of the object.

11. The system of claim 10, wherein the object is a medication pill.

12. The system of claim 10, wherein the processor is operable to guide repeatedly placement of the object held in the hand of the user relative to the indication of desired location for placement of the object until the processor confirms that the object is properly placed.

13. The system of claim 10, wherein the processor is arranged to determine a parallax angle of movement of the object.

14. The system of claim 13, wherein the processor employs the determined parallax angle to aid in determining positioning of the object in the hand of the user relative to the desired location for placement of the object.

15. The system of claim 10, wherein the processor is arranged to cause to be displayed on the display an image of the desired location for the placement of the object.

16. The system of claim 15, wherein the desired location for the placement of the object is displayed to a user to aid in properly placing the object held in the hand of the user.

17. The system of claim 10, wherein if the object held in the hand of the user is removed from a field of view of the camera and then repositioned within the field of view of the camera, the processor determines the first size of the object in the hand of the user.

18. The system of claim 10, wherein the object is a free standing object held in the hand of the user.

19. The system of claim 10, wherein the processor is arranged to display repeatedly an indicator on the display guiding in the field of view of the camera placement of the object held in the hand of the user relative to the indication of desired location for placement of the object until the processor confirms that the object is properly placed.

20. The system of claim 10, wherein if the object held in the hand of the user is removed from a field of view of the camera and then repositioned within the field of view of the camera, the processor determines a position of the object again.

* * * * *